United States Patent
Kang et al.

(10) Patent No.: US 9,804,346 B2
(45) Date of Patent: Oct. 31, 2017

(54) RECEPTACLE-COLLIMATOR ASSEMBLY AND MULTI-WAVELENGTH OPTICAL RECEIVER MODULE

(71) Applicant: ELECTRONICS AND TELECOMMUNICATIONS RESEARCH INSTITUTE, Daejeon (KR)

(72) Inventors: Sae Kyoung Kang, Daejeon (KR); Joon Ki Lee, Daejeon (KR); Joon Young Huh, Daejeon (KR); Jie Hyun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/010,657

(22) Filed: Jan. 29, 2016

(65) Prior Publication Data
US 2017/0082808 A1    Mar. 23, 2017

(30) Foreign Application Priority Data
Sep. 17, 2015    (KR) .................. 10-2015-0131887

(51) Int. Cl.
*G02B 6/32* (2006.01)
*G02B 6/42* (2006.01)
*G02B 6/293* (2006.01)

(52) U.S. Cl.
CPC ......... *G02B 6/4206* (2013.01); *G02B 6/2938* (2013.01); *G02B 6/29365* (2013.01); *G02B 6/32* (2013.01); *G02B 6/421* (2013.01); *G02B 6/4208* (2013.01); *G02B 6/4244* (2013.01); *G02B 6/4249* (2013.01)

(58) Field of Classification Search
CPC .... G02B 6/4206; G02B 6/29365; G02B 6/32; G02B 6/4244; G02B 6/4208; G02B 6/421; G02B 6/4249; G02B 6/2938
See application file for complete search history.

(56) References Cited

U.S. PATENT DOCUMENTS

| | | | | |
|---|---|---|---|---|
| 5,537,503 A | * | 7/1996 | Tojo | G02B 6/4207 385/147 |
| 6,515,776 B1 | * | 2/2003 | Naganuma | G02B 6/29367 398/82 |
| 7,059,780 B2 | | 6/2006 | Yamabayashi et al. | |
| 8,540,437 B2 | | 9/2013 | Lee et al. | |
| 2014/0346323 A1 | | 11/2014 | Fujimura et al. | |

OTHER PUBLICATIONS

T. Yoshimatsu et al., "Compact and high-sensitivity 100-Gb/s (4×25 Gb/s) APD-ROSA with a LAN-WDM PLC demultiplexer", Optics Express, vol. 20, No. 26, pp. 393-398, Dec. 2012.

* cited by examiner

*Primary Examiner* — Ryan Lepisto
(74) *Attorney, Agent, or Firm* — LRK Patent Law Firm

(57) ABSTRACT

A receptacle-collimator assembly and a multi-wavelength optical receiver module. The receptacle-collimator assembly includes a receptacle configured to receive a wavelength-multiplexed optical signal; and a collimator integrated with the receptacle and configured to generate a collimated beam signal from a multi-wavelength optical signal received from the receptacle and output the beam signal.

3 Claims, 13 Drawing Sheets

RECEPTACLE-COLLIMATOR ASSEMBLY AND MULTI-WAVELENGTH OPTICAL RECEIVER MODULE

CROSS-REFERENCE TO RELATED APPLICATION(S)

This application claims priority to Korean Patent Application No. 10-2015-0131887, filed on Sep. 17, 2015, in the Korean Intellectual Property Office, the disclosure of which is incorporated herein by reference in its entirety.

BACKGROUND

1. Field

The following description relates to an optical receiver module for optical communications.

2. Description of the Related Art

An optical transceiver is a module that converts a received electrical signal into an optical signal or vice versa, and behaves as an optical interface at an end of an optical transmission system or a router. As the amount of data to be transmitted increases, the optical transceiver uses a wavelength division multiplexing (WDM) transmission technology whereby signals of different wavelengths are multiplexed into one fiber and a resulting signal is transmitted. The WDM transmission technology is applied not only in backbone transmission networks, but also for a field of short range Ethernet transmission, by which 100G Ethernet signals are currently transmitted through single-mode and multi-mode optical fibers.

SUMMARY

The following description relates to a receptacle-collimator assembly with high productivity for which manufacturing processes and packaging process are simplified, and an optical receiver module including the receptacle collimator assembly.

In one general aspect, there is provided a receptacle-collimator assembly including: a receptacle configured to receive a wavelength-multiplexed optical signal; and a collimator integrated with the receptacle and configured to generate a collimated beam signal from a multi-wavelength optical signal received from the receptacle and output the beam signal.

A fiber stub of the receptacle and a collimating lens of the collimator may be coaxially aligned with each other in a housing.

The collimator may include: a sleeve; and a collimating lens with the same external diameter as a fiber stub of the receptacle, the collimating lens being inserted into the sleeve and comprising a projection protruding outward from a front edge thereof to come in contact with the fiber stub, and a remaining portion other than the projection being spaced apart from the fiber stub.

The collimator may include: sleeve A; sleeve B into which a fiber stub is inserted and which is inserted into sleeve A; and a collimating lens with the same external diameter as sleeve B, the collimating lens having a projection protruding outward from a front edge thereof to come in contact with sleeve B inserted in sleeve A and a remaining portion other than the projection being spaced apart from the fiber stub.

The collimator may include: a sleeve; a collimating lens having the same external diameter as a fiber stub and being inserted into the sleeve; and a plate-shaped spacer located between the fiber stub and the collimating lens to space the fiber stub apart from the collimating lens.

The spacer may be made of a transparent material and coated with an anti-reflective substance.

The collimator may include: a sleeve; a collimating lens having the same external diameter as a fiber stub and being inserted into the sleeve; and a ring-shaped spacer located between the fiber stub and the collimating lens to space the fiber stub apart from the collimating lens.

The spacer may have an internal diameter greater than a diameter of the collimated beam signal.

The collimator may include: a sleeve having a projection protruding inward, wherein a fiber stub is located on one side of the projection and a collimating lens is located at the other side of the projection; and the collimating lens having the same external diameter as the fiber stub and being inserted into the sleeve and spaced apart from the fiber stub by a projection of the sleeve.

The collimator may include: sleeve A; sleeve B facing sleeve A; a housing having a projection protruding inward, wherein sleeve A and sleeve B are each located on opposite sides of the projection; and a collimating lens being inserted into sleeve A and spaced apart from a fiber stub inserted in sleeve A by the projection of the housing.

The collimator may include: a collimating lens having the same external diameter as a fiber stub; a ring-shaped spacer located between the fiber stub and the collimating lens to space the fiber stub from the collimating lens; and a housing configured to accommodate the collimating lens, the spacer, and the fiber stub.

The collimator may include: a collimating lens having the same external diameter as a fiber stub, a plate-shaped spacer located between the fiber stub and the collimating lens to space the fiber stub from the collimating lens; and a housing configured to accommodate the collimating lens, the spacer, and the fiber stub.

A fiber stub of the receptacle may have a surface facing the collimator and the surface has a flat facet or an angled facet relative to the collimator.

In another general aspect, there is provided an optical receiver module including: a receptacle-collimator assembly configured by integrating a receptacle and a collimator into one body, wherein the receptacle receives a wavelength-multiplexed optical signal and the collimator generates a collimated beam signal from the wavelength-multiplexed optical signal; an optical demultiplexer configured to demultiplex the collimated beam signal generated by the collimator, using a zigzag optical path created by a thin-film filter; and a photodetector block configured to comprise photodetectors, each of which receives an optical signal demultiplexed by the optical demultiplexer.

The photodetector block may include: an optical coupler lens configured to focus the demultiplexed optical signal from the optical demultiplexer; one or more photodetectors each configured to perform photoelectric conversion on an optical signal received through the optical coupler lens; and a transimpedance amplifier configured to receive an electrical signal from each of the photodetectors and amplify the electrical signal.

The photodetector block may further include a spacer to space the optical coupler lens from the photodetectors.

The transimpedance amplifier may be attached onto a metal bench on a top surface of a lower substrate, and the photodetectors may be attached onto one surface of a photodetector substrate which is formed on the top surface of the lower substrate and is aligned with the metal bench.

The optical demultiplexer and the photodetectors may be attached onto a substrate through active alignment.

Other features and aspects will be apparent from the following detailed description, the drawings, and the claims.

Figure 1:
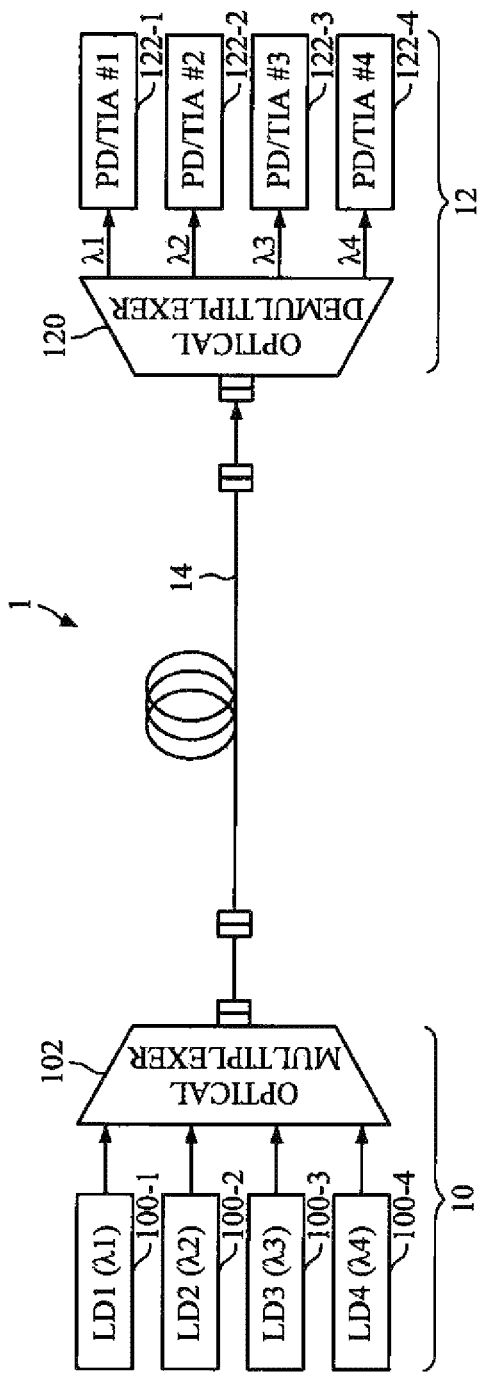
FIG. 1 is a diagram illustrating an optical transceiver that transmits and receives a multi-wavelength optical signal according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an optical transceiver that transmits and receives a multi-wavelength optical signal according to an exemplary embodiment.

Referring to FIG. 1, an optical transceiver 1 includes a transmitter optical sub-assembly (hereinafter, will be referred to as "TOSA") 10, a receiver optical sub-assembly (hereinafter, will be referred to as "ROSA") 12. The TOSA 10 includes laser diodes (LDs) 100-1, 100-2, 100-3, and 100-4 as light sources, and an optical multiplexer 102. The ROSA 12 includes an optical demultiplexer 120 and photo diode/transimpedance amplifiers (ID/TIA) 122-1, 122-2, 122-3, and 122-4. The PD is an example of photodetector.

If multiple wavelengths, for example, as shown in FIG. 1, four wavelengths are used, the TOSA 10 generates four optical signals with four wavelengths through the four LDs 100-1, 100-2, 100-3, and 100-4, and the optical multiplexer multiplexes the optical signals into a wavelength-multiplexed optical signal and transmits the optical signal to a fiber 14. The ROSA 12 receives the four-wavelength-multiplexed optical signal that has passed through the fiber 14. The ROSA 12 divides the received optical signal by wavelength into four optical signals and applies each of the divided optical signals to each of the PD/TIAs 122-1, 122-2, 122-3, and 122-4 over each channel. Each of the PD/TIAs 122-1, 122-2, 122-3 and 122-4 performs photoelectric conversion on the applied optical signal, amplifies a resulting signal and outputs the amplified electric signal.

Figure 2:
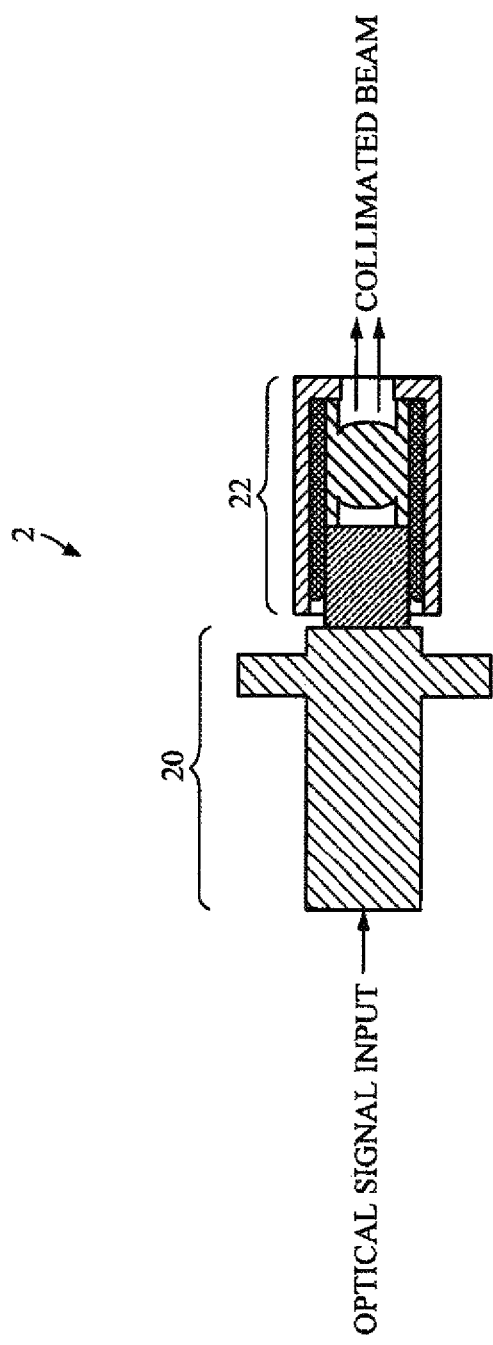
FIG. 2 is a diagram illustrating a receptacle-collimator assembly according to an exemplary embodiment.

FIG. 2 is a diagram illustrating a receptacle-collimator assembly according to an exemplary embodiment. Referring to FIG. 2, the receptacle-collimator assembly 2 is configured by integrating a receptacle 20 and a collimator 22 into one body. A fiber may be inserted into or removed from the receptacle 22 that receives an optical signal. The receptacle 20 may be a standardized receptacle, such as a subscriber connector (SC), a lucent connector (LC), etc.

The collimator 22 generates a collimated beam signal from the optical signal input from the receptacle 20. The collimator 22 may be configured by integrating a fiber stub of the receptacle 20 into one housing. In this case, in said housing, the fiber stub of the receptacle 20 is coaxially aligned with a collimating lens of the collimator 22.

FIGS. 3 to 6 are diagrams illustrating examples of collimator which uses a single sleeve.

Figure 3:
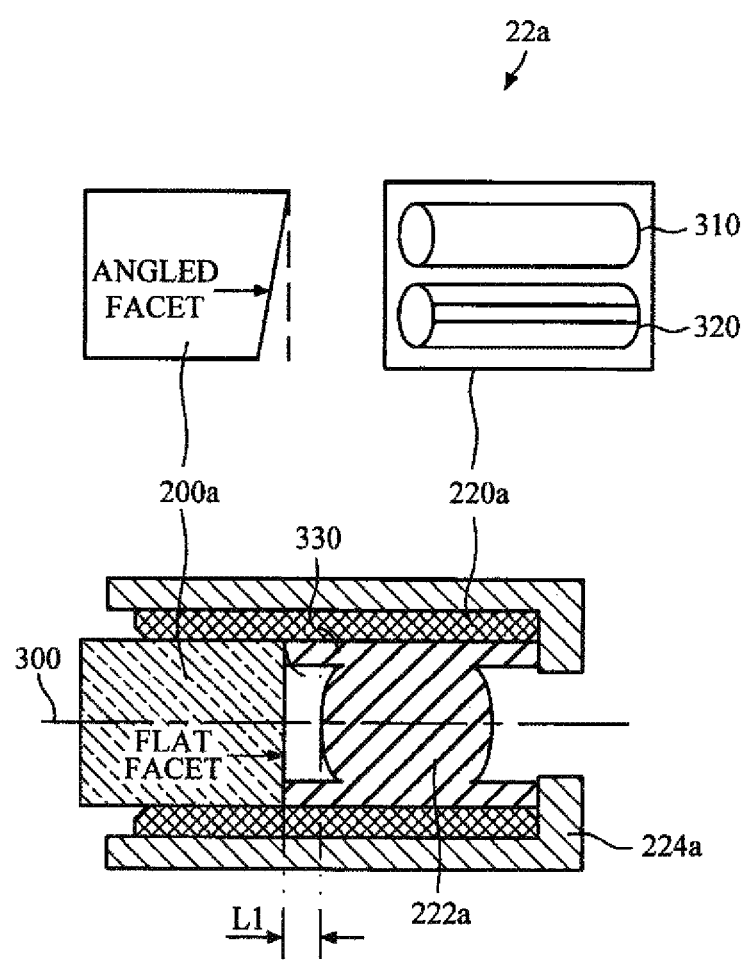
FIGS. 3 to 6 are diagrams illustrating examples of collimator which uses a single sleeve.

Referring to FIG. 3, a collimator 22a includes a single sleeve 220a, a collimating lens 222a, and a housing 224a.

The use of the sleeve 220a facilitates coaxial alignment of a fiber stub 200a of the receptacle and the collimating lens 222a. As shown in FIG. 3, the sleeve 220a may be a hollow cylinder 310 or have a portion 320 on one side thereof removed (C-type).

The collimating lens 222a receives a multi-wavelength optical signal that has passed through the fiber stub 220a, and generates a collimated beam signal from the received optical signal and outputs said beam signal. The collimating lens 222a is inserted in the sleeve 220a. The collimating lens 222a has the same external diameter as the optical stub 220a, and has a projection 330 protruding outward from a front edge thereof to come in contact with the fiber stub 220a. The central area of the collimating lens 222a is apart from the fiber stub 220a at a distance of L1. The projection 330 extends to a specific length from the edge of the collimating lens 222a such that the collimating lens 222a is apart from the fiber stub 220a at a distance of L1. A surface of the fiber stub 220a that faces the collimating lens 222a may be a flat facet or an angled facet relative to the collimator 222a, as shown in FIG. 3.

The housing 224a accommodates the sleeve 220a, the fiber stub 200a, and the collimating lens 222a. The housing 224a may be made of metal, glass material, or plastic. The sleeve 220a may be made of glass, metal, or ceramic. For example, if the housing 224a is made of Steel Use Stainless (SUS) metal, the housing 224a is assembled with a metal package of ROSA using laser welding techniques, which provide the reliability and the convenience of assembly.

Figure 4:
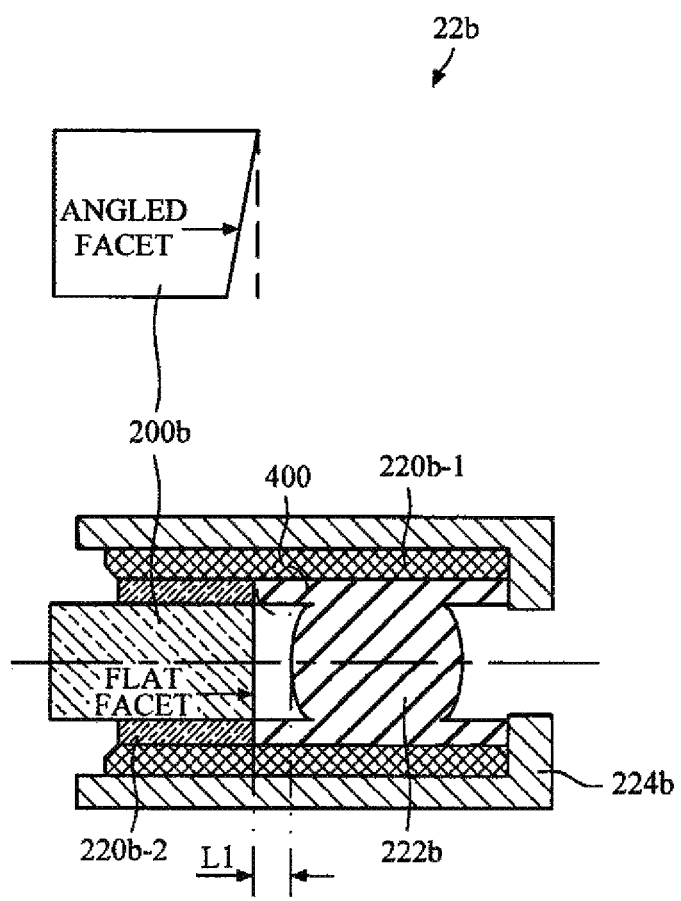

FIG. 4 is a diagram illustrating an example of a collimator structure to reduce a difference between a fiber stub and sleeve A.

Referring to FIG. 4, if there is a difference in size between a fiber stub 200b and sleeve A 220b-1, a collimator 22b may increase an external diameter of the fiber stub 220b using sleeve B 220b-2 and then insert the increased fiber stub 220b into sleeve A 220b-1. The collimating lens 222b has the same external diameter as sleeve B 220b-2, and has a projection 400 protruding outward from a front edge thereof to come in contact with sleeve B 220b-2 inserted in sleeve A 220b-1. The central area of the collimating lens 222b is apart from the fiber stub 220b at a distance of L1.

Figure 5:
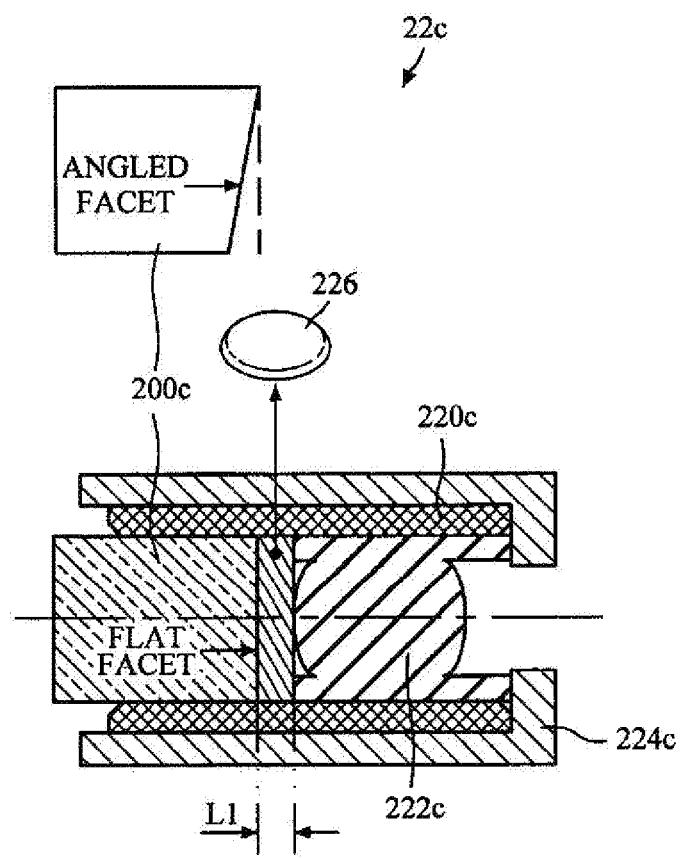

FIG. 5 is a diagram illustrating an example of a collimator that has the same external diameter as a fiber stub and includes a transparent plate spacer.

Referring to FIG. 5, a fiber stub 200c and a collimating lens 222c are apart from each other at a distance of L1. To space the fiber stub 200c from the collimating lens 222c at a distance of L1, an optically transparent plate as a spacer 226 is placed between the fiber stub 200c and the collimating lens 222c. The spacer 226 may be made of a material, such as glass and plastic, which is transparent with respect to a wavelength of an optical signal. Anti-reflective coating may be applied to the spacer 226. The sleeve 220c accommodates the fiber stub 110c, the collimating lens 222c, and the spacer 226. A housing 224c accommodates the sleeve 220c.

Figure 6:
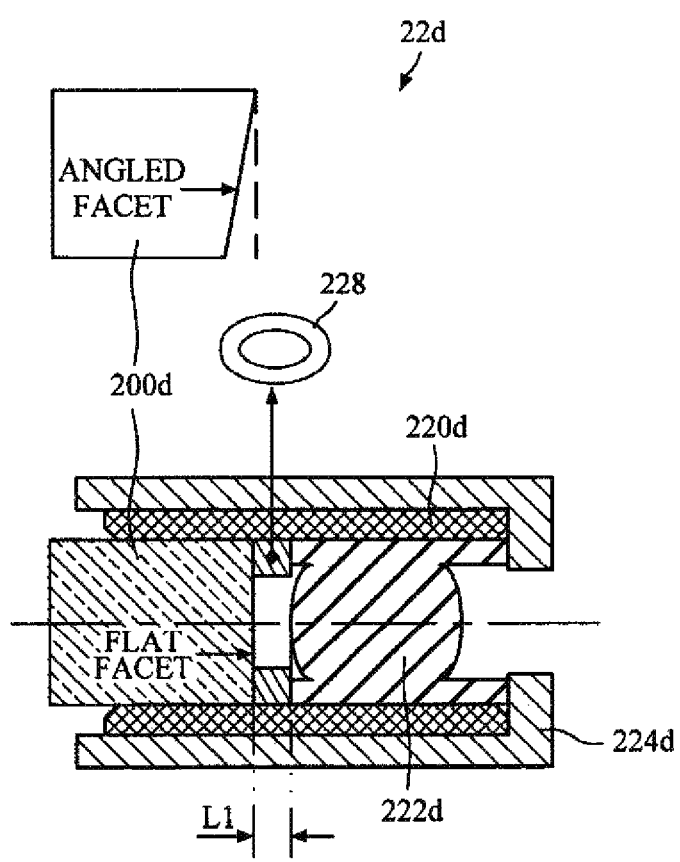

FIG. 6 is a diagram illustrating an example of a collimator with the same external diameter as a fiber stub, including a ring-shaped spacer.

Referring to FIG. 6, a fiber stub 200d and a collimating lens 222d are apart from each other at a distance of L1. To space the fiber stub 200d from the collimating lens 222d at a distance of L1, a ring-shaped spacer 228 is placed between the fiber stub 200d and the collimating lens 222d. The spacer 228 may be made of glass, metal, or ceramic. An internal diameter of the spacer 228 has to be much larger than a diameter of a collimated beam signal so that it does not interfere with the collimated beam signal. The sleeve 220d accommodates the fiber stub 200d, the collimating lens 222d, and the spacer 228. The housing 224d accommodates the sleeve 220d.

FIGS. 7 to 10 are diagrams illustrating in detail examples of a collimator that does not use a single sleeve.

Figure 7:
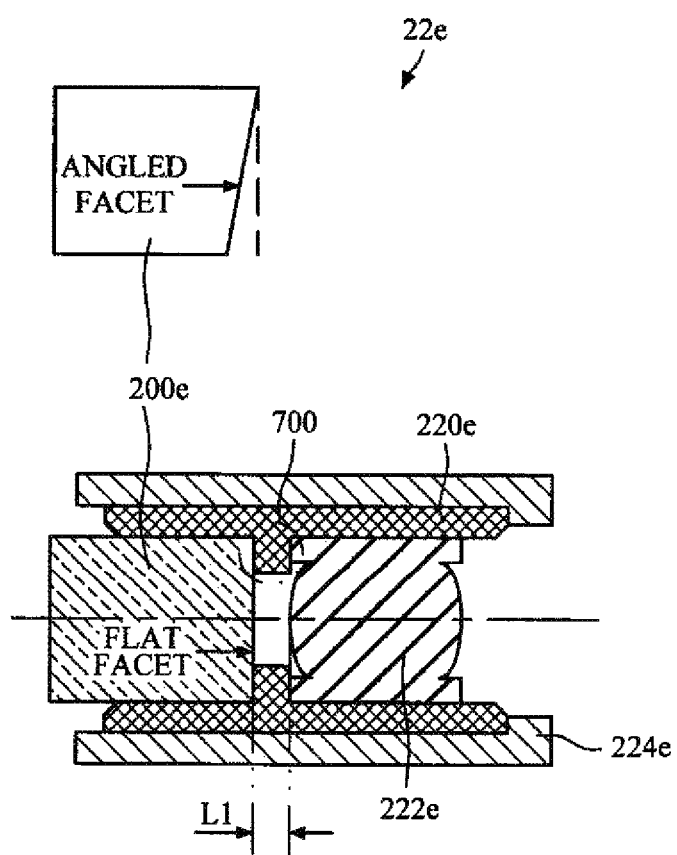
FIGS. 7 to 10 are diagrams illustrating in detail examples of a collimator that does not use a single sleeve.

Referring to FIG. 7, a collimator 22e has a projection 700 in a sleeve 220e. The projection 700 is located between a fiber stub 200e and a collimating lens 222e. The collimating lens 222e with the same external diameter as the fiber stub 200e is inserted into the sleeve 220e, whose projection 700 spaces the collimating lens 222e apart from the fiber stub 200e at a distance of L1. The sleeve 220e accommodates the fiber stub 200e and the collimating lens 222e, and a housing 224e accommodates the sleeve 220e. The housing 224e may be made of metal, glass material, or plastic. The sleeve 220e may be made of glass, metal, or ceramic.

Figure 8:
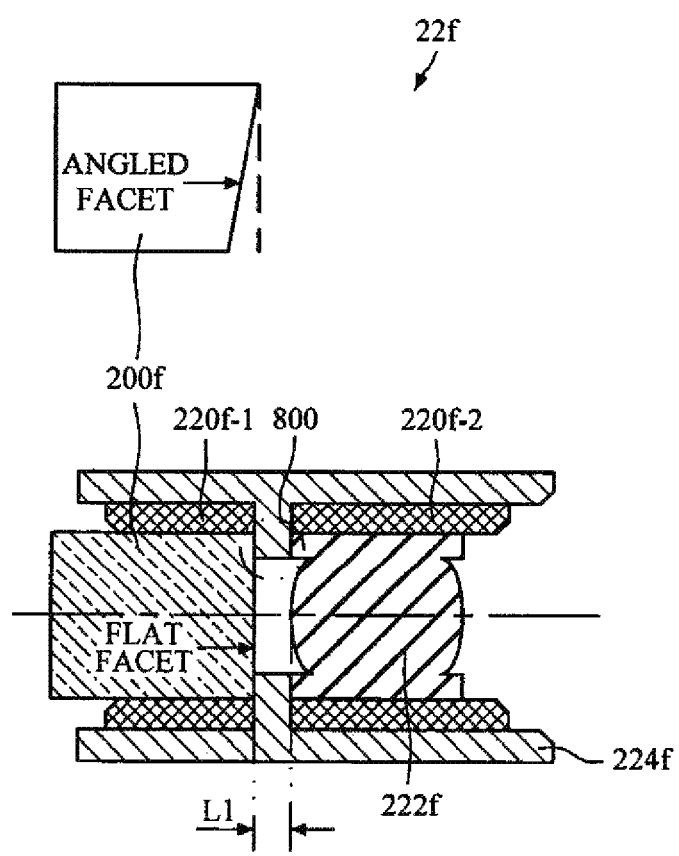

FIG. 8 is a diagram illustrating a collimator 22f that includes two sleeves 220f-1 and 220f-2 for a fiber stub 200f and a collimating lens 222f and a projection 800 of a housing 224f that is located between the two sleeves 220f-1 and 220f-2. Each of the sleeves 220f-1 and 220f-2 is located at each side of the projection 800 in the housing 224f. The projection 800 of the housing 224f spaces the collimating lens 222f from the fiber stub 200f at a distance of L1, wherein the collimating lens 222f is inserted into one sleeve 220f-2 and the fiber stub 200f is inserted into the other sleeve 220f-1.

Figure 9:
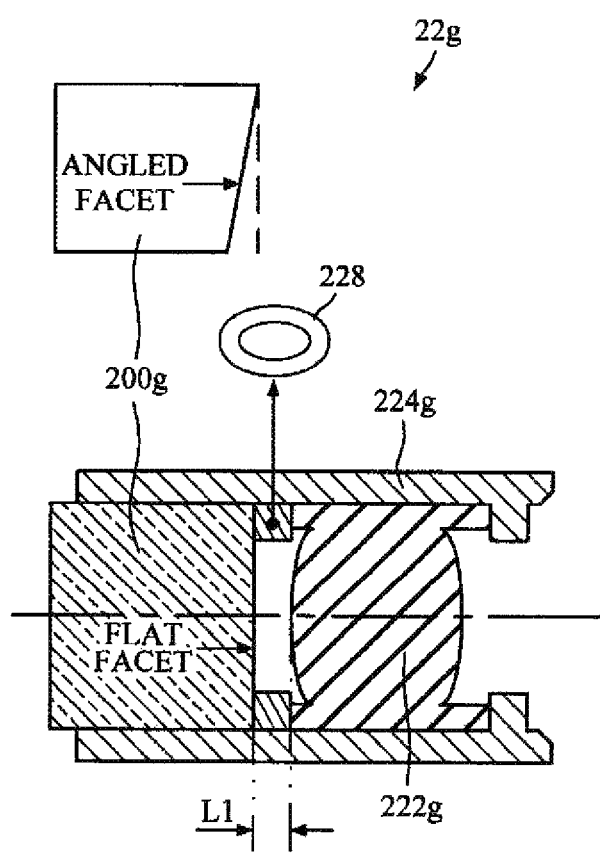

FIG. 9 is a diagram illustrating a collimator 22g which does not use a sleeve but includes a precisely machined metal housing 224g which accommodates a collimating lens 222g, a ring-shaped spacer 228 and a fiber stub 200g. The collimating lens 222g has the same external diameter as the fiber stub 200g. The ring-shaped spacer 228 is placed between the fiber stub 200g and the collimating lens 222g, thereby spacing the fiber stub 200g apart from the collimating lens 222g at a distance of L1.

Figure 10:
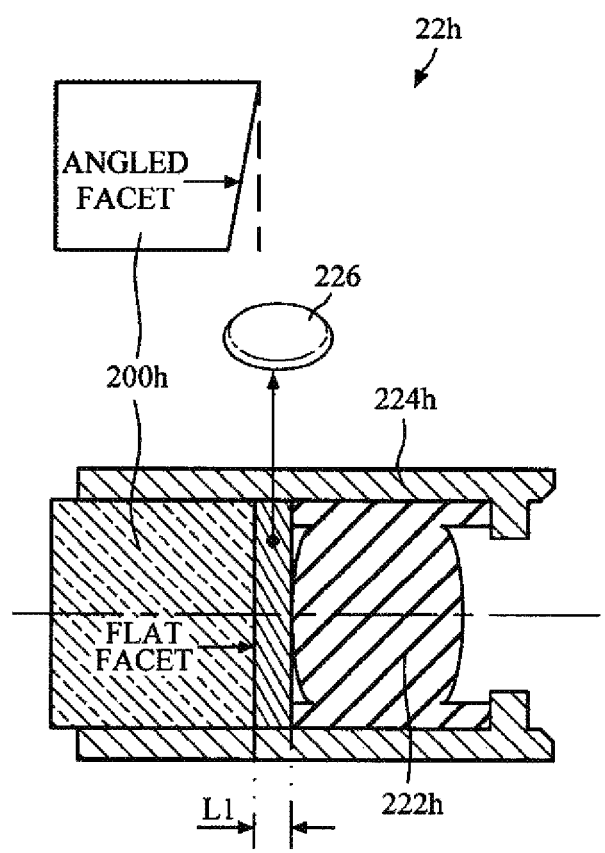

FIG. 10 is a diagram illustrating a collimator 22h that does not use a sleeve but includes a precisely machined metal housing 224h which accommodates a collimating lens 222h, a plate-shaped spacer 226, and a fiber stub 200h. The collimating lens 222h has the same external diameter as the fiber stub 200h. The plate-shaped spacer 226 is located between the fiber stub 200h and the collimating lens 222h, thereby spacing the fiber stub 200h apart from the collimating lens 222h at a distance of L1.

Figure 11:
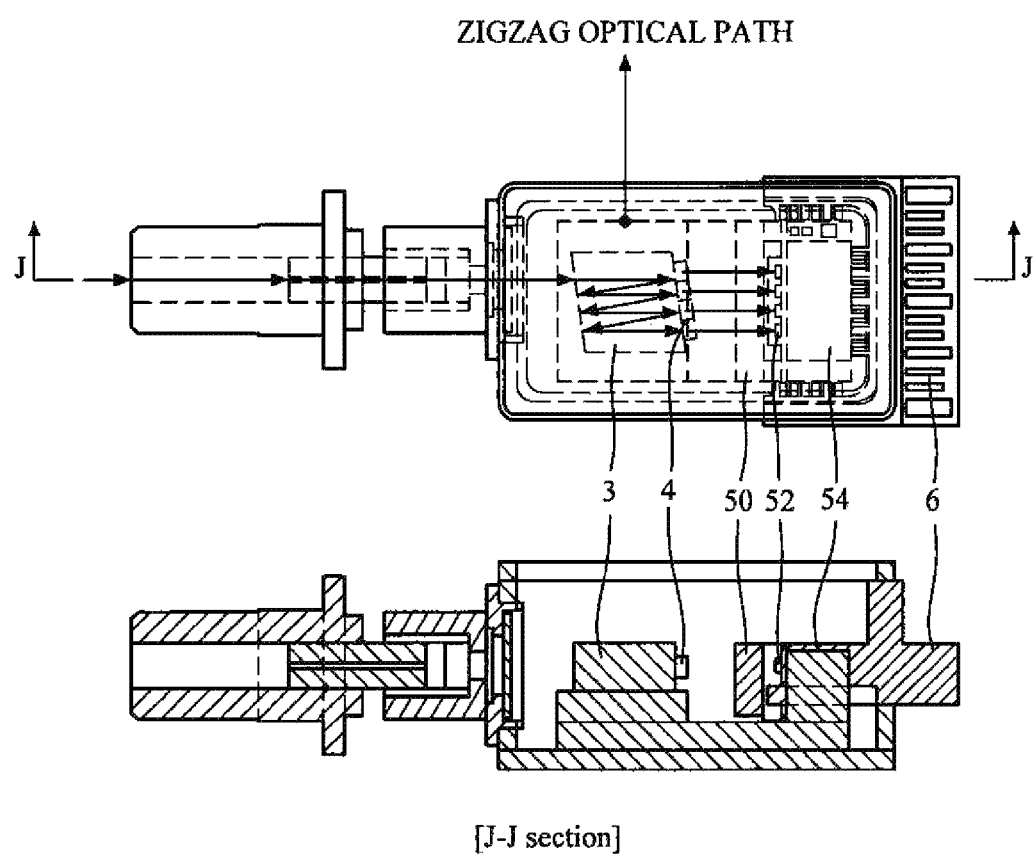
FIG. 11 is a diagram illustrating a receiver optical sub-assembly (hereinafter, will be referred to as "ROSA") according to an exemplary embodiment.
Figure 12:
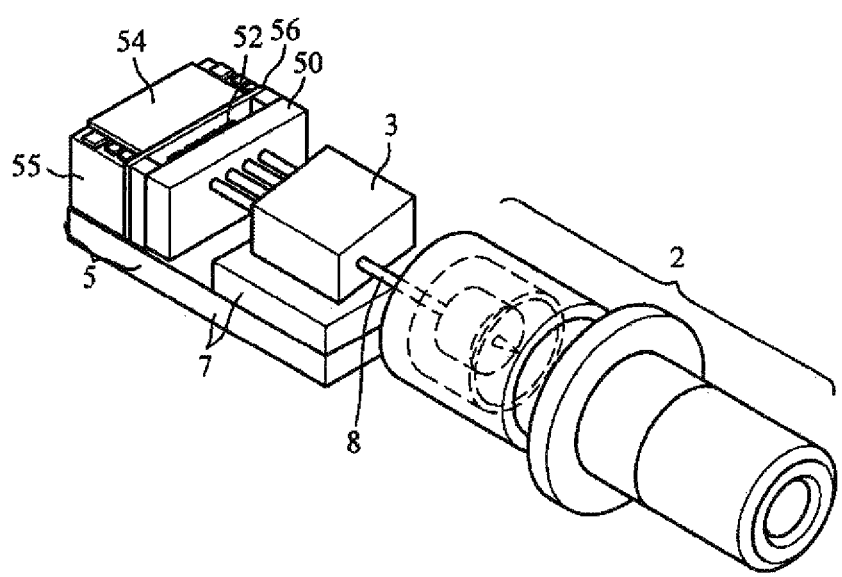
FIG. 12 is a diagram illustrating in detail the ROSA according to an exemplary embodiment.
Figure 13:
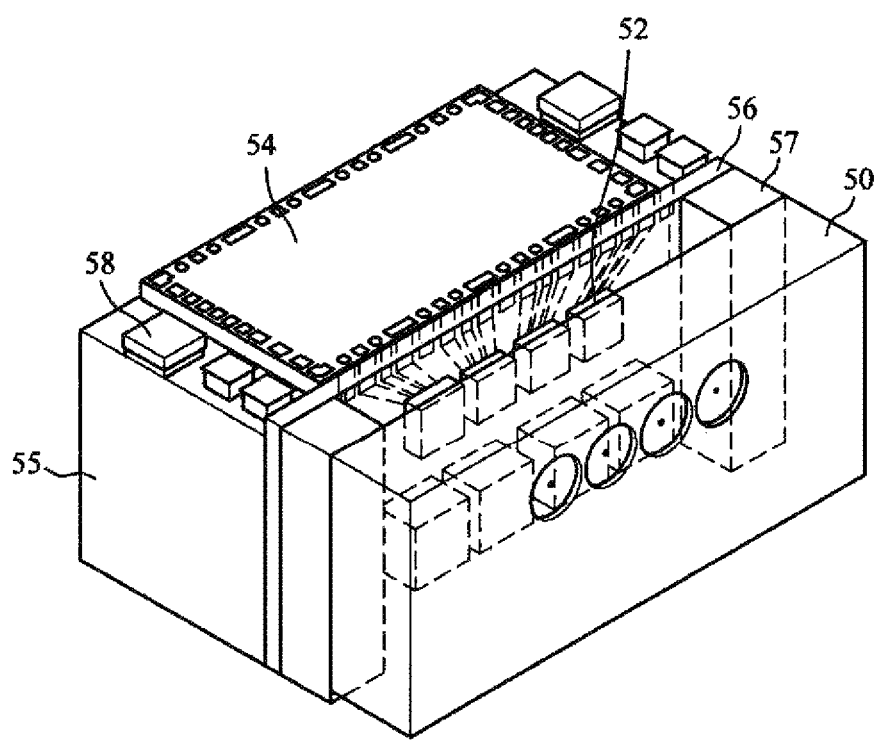
FIG. 13 is a diagram illustrating in detail a photodetector block according to an exemplary embodiment.

FIGS. 11 to 13 are diagram illustrating a structure of a ROSA that includes a receptacle-collimator assembly.

With the increase in the number of channels of a ROSA, the number of parts to be packaged in the ROSA increases, which leads to an increase in the number of packaging processes as well as the degree of difficulty in packaging, and hence an increase in the probability of errors. However, by applying the aforesaid receptacle-collimator assembly, as shown in FIGS. 2 to 10, to a ROSA, it may be possible to simplify the manufacturing process, facilitate the package process, and hence increase the productivity.

FIG. 11 is a diagram illustrating a ROSA according to an exemplary embodiment.

Referring to FIG. 11, a ROSA includes a receptacle-collimator assembly 2, an optical demultiplexer 3, a thin-film filter 4, photodetectors 52, and a TIA 54.

The receptacle-collimator assembly 2 has the same configuration as described with reference to FIGS. 2 to 10, and thus detailed description thereof will be omitted.

The optical demultiplexer 3 uses the thin-film filter 4 to create a "zigzag" optical path, for which the thin-film filter 4 has a front surface coated with a reflective material and a back surface coated with an anti-reflective material. A collimated beam signal generated by the receptacle-collimator assembly 2 is applied to the optical demultiplexer 3, and the optical demultiplexer 3 optically demultiplexes said signal. A demultiplexed optical signal from the optical demultiplexer 3 is applied to a photodetector 52 of each channel, and the TIA 54. Each photodetector 52 performs photoelectric conversion and the TIA 54 amplifies an electric signal resulting from the photoelectric conversion.

As shown in FIG. 11, the high-speed signal path of the ROSA is advantageous in terms of signal integrity since an output end of the TIA 54 and an electrical interface 6 of a package are located on the same plane of the signal path.

FIG. 12 is a diagram illustrating in detail a ROSA according to the exemplary embodiment.

Referring to FIG. 12, a wavelength-multiplexed optical signal is applied to a receptacle-collimator assembly 2, and the receptacle-collimator assembly 2 outputs a collimated beam signal. The collimated beam signal is wavelength-demultiplexed while passing through a "zigzag" optical path created by a thin-film filter 4 and a mirror surface in an optical demultiplexer 3. An optical signal resulting from the wavelength-demultiplexing of the beam signal enters a photodetector block 5. The photodetector block 5 includes an optical coupler lens 50, photodetectors 52, and a TIA 54.

The optical coupler lens 50, the photodetectors 52, and the TIA 54 are attached onto a metal bench 55. For precise attachment of the photodetectors 52, the photodetectors 52 may be adhered to a substrate 7 provided with an alignment mark.

The substrate 7 may be made of silicon or ceramic (e.g., aluminum nitride). The optical coupler lens 50 may be attached onto the substrate 7 to focus light onto an active area of the photodetectors 52. The optical coupler lens 50 may be omitted from the ROSA. In the absence of optical coupler lens 50, a lens formed on the photodetectors or an optical output from the optical demultiplexer 3 may be optically coupled directly with the general plane photodetectors 52. The photodetectors 52 and the substrate 7 may be electrically connected to each other via wire bonding or soldering. A signal pattern is formed on a photodetector substrate 56, and the TIA 54 and the signal pattern may be electrically connected to each other via wire bonding.

The substrate 7 may be made of silicon, glass, or metal, and be in various shapes. The substrate 7 may be formed as multiple platforms, as shown in FIG. 12, or it may be formed as a single substrate according to an internal structure of ROSA.

FIG. 13 is a diagram illustrating in detail a photodetector block according to an exemplary embodiment.

Referring to FIG. 13, a photodetector block 5 includes an optical coupler lens 50, photodetectors 52, a TIA 54, a metal bench 55, a photodetector substrate 56, spacers 57, and capacitors 58 for power noise cancellation.

The optical coupler lens 50 attached above the photodetectors 52 can be omitted according to the structure of ROSA. The TIA 54 is attached onto the metal bench 55, and the photodetectors 52 are attached on the photodetector substrate 56 which is aligned with the metal bench 55. The spacers 57 are attached onto the photodetector substrate 56 to space the photodetectors 52 apart from the optical coupler lens 50 at a specific distance.

As shown in FIGS. 12 and 13, the receptacle-collimator assembly 2, the optical demultiplexer 3, and the photodetector block 5 can be independently manufactured, and hence the probability of errors may be reduced. The individual manufactured blocks are attached onto the substrate 7 through active alignment.

According to the above exemplary embodiments, the receptacle and the collimators are integrated into one body, so that manufacturing processes are simplified, packaging process is facilitated, as well as the productivity is increased. Further, since the receptacle-collimator assembly, the optical demultiplexer, and the photodetector block, which constitute the optical receiver module, are manufactured independently of each other, each component in the part can be tested individually, and the optical receiver module is manufactured by assembling the parts, an error rate can be reduced.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A receptacle-collimator assembly comprising:
   a receptacle configured to receive a wavelength-multiplexed optical signal; and
   a collimator integrated with the receptacle and configured to generate a collimated beam signal from a multi-wavelength optical signal received from the receptacle and output the beam signal,
   wherein the collimator comprises: a sleeve; and a collimating lens with the same external diameter as a fiber stub of the receptacle, the collimating lens being inserted into the sleeve and comprising a projection protruding outward from a front edge thereof to come in contact with the fiber stub, and a remaining portion other than the projection being spaced apart from the fiber stub.

2. The receptacle-collimator assembly of claim 1, wherein a fiber stub of the receptacle and a collimating lens of the collimator are coaxially aligned with each other in a housing.

3. The receptacle-collimator assembly of claim 1, wherein a fiber stub of the receptacle has a surface facing the collimator and the surface has a flat facet or an angled facet relative to the collimator.

* * * * *